United States Patent
Tan

(10) Patent No.: US 7,945,648 B2
(45) Date of Patent: May 17, 2011

(54) METHODS AND SYSTEMS FOR DYNAMICALLY CONFIGURING A NETWORK COMPONENT TO REROUTE MEDIA STREAMS

(75) Inventor: Wai-tian Tan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1511 days.

(21) Appl. No.: 10/695,259

(22) Filed: Oct. 27, 2003

(65) Prior Publication Data

US 2005/0114472 A1    May 26, 2005

(51) Int. Cl.
*G06F 15/177* (2006.01)
*G06F 15/173* (2006.01)
*H04N 7/173* (2011.01)
*H04N 7/16* (2011.01)

(52) U.S. Cl. ........ 709/221; 709/220; 709/238; 709/239; 725/86; 725/87; 725/101; 725/104; 725/149

(58) Field of Classification Search .............. 725/149, 725/86, 87, 101, 104; 709/221, 220, 238, 709/239
See application file for complete search history.

(56) References Cited

U.S. PATENT DOCUMENTS

| | | | |
|---|---|---|---|
| 6,785,704 B1 * | 8/2004 | McCanne | 718/105 |
| 7,076,478 B2 * | 7/2006 | O'Rourke et al. | 707/3 |
| 2002/0156842 A1 * | 10/2002 | Signes et al. | 709/203 |
| 2003/0028643 A1 * | 2/2003 | Jabri | |
| 2003/0070172 A1 * | 4/2003 | Matsuzaki et al. | 725/87 |
| 2003/0172163 A1 * | 9/2003 | Fujita et al. | 709/226 |
| 2004/0193727 A1 * | 9/2004 | Varga et al. | 709/238 |

FOREIGN PATENT DOCUMENTS

EP  1309149  5/2003

OTHER PUBLICATIONS

S Roy et al—"A System Architecture for Managing Mobile Streaming Media Services"—2002 IEEE Workshop on 9-11 Multimedia Signal Processing Dec. 2002.

* cited by examiner

*Primary Examiner* — Hoang-Vu A Nguyen-Ba

(57) ABSTRACT

A method for dynamically configuring a network component to reroute media streams is disclosed. The method includes receiving a request for content from a first network connected component and determining a type of media service needed for at least a portion of the content. Moreover, the method includes configuring a network data relaying component to forward at least a portion of the content from a second network connected component to a third network connected component.

33 Claims, 10 Drawing Sheets

METHODS AND SYSTEMS FOR DYNAMICALLY CONFIGURING A NETWORK COMPONENT TO REROUTE MEDIA STREAMS

TECHNICAL FIELD

The present invention relates generally to streaming media transmissions.

BACKGROUND ART

Streaming media transmissions involve the transmission of sound and pictures over the Internet in a streaming or continuous manner using data packets. The most effective manner of receiving streaming media requires some form of broadband technology such as a cable modem or digital subscriber line (DSL). Typical streaming media transmissions generally involve conventional client-server models.

FIG. 1 shows a typical client-server model and illustrates conventional client-server communications. In a streaming media session, a streaming client typically assumes that it is communicating with a single server, as is shown in FIG. 1 (see arrows illustrating a request for and delivery of data from client to server). Nevertheless, media delivery infrastructures have evolved from single server solutions to include delivery infrastructure that incorporate multiple distributed servers in the form of overlay networks such as that shown in FIG. 2.

The servers or nodes in the overlay network provide functionality that enhances the delivery of Web and streaming media. However, conventional systems that employ the overlay architecture have two important limitations. First, they typically exploit only the caching capabilities of the overlay nodes. Second, explicit client involvement may be required in realizing such caching capabilities. One example of overlay caching is Content Distribution Networks (CDN) whose operations are shown in FIG. 2. In a CDN, content are replicated a priori in multiple overlay nodes so that a client can access content from a closer overlay node than the original server.

Another common example of overlay caching is Web caching. Web caching differs from a CDN in that contents are delivered to a Web cache on-demand, rather than a priori for a CDN. Current versions of Netscape™ and Internet Explorer™ Web browsers have support for proxy configuration which allows all Web traffic to be directed to a specified Web cache. This functionality reduces the total amount of network traffic that is in motion and improves the response time of these browsers. Nevertheless, the above proxy solution requires explicit proxy support on the part of the application and knowledge to properly configure the proxy on the part of the user. As a result, default mechanisms for redirecting Web traffic to Web caches continue to be needed for mis-configured browsers and browsers that lack proxy support.

An existing solution to eliminate client involvement in a Web-caching context includes the Web Cache Communication Protocol (WCCP), which is supported by a number of existing routers. Specifically, through WCCP, routers can selectively or completely redirect Web or hypertext transfer protocol (HTTP) traffic to specified Web caches.

FIG. 3 illustrates the operation of a WCCP enabled router. Referring to FIG. 3, where a browser client B requests content from server S, a WCCP enabled router R located in a path between B and S is configured to redirect all HTTP traffic to a Web cache C. In this way, B can obtain a desired piece of content from C (a more efficient place from which to receive the content) despite the fact that the request is directed to S. The client B thinks it is communicating with server S when the data is actually served from Web cache C. Since client B is unaware of the caching mechanism, the procedure is client-transparent. In contrast, a solution involving setting a proxy in the client is not client-transparent since the client is explicitly instructed to contact a cache.

Besides the WCCP, there are a number of other mechanisms that are utilized to effect a redirection of client requests to appropriate servers. A common technique is based on modifications of the Internet Domain Name Service (DNS) and does not assume the existence of router support.

It should be appreciated that simple access to Web pages typically consists of two steps: (1) a client's request, (2) followed by a server's transmission of requested data, as is illustrated in FIGS. 1 and 2. However, accesses to streaming media content typically involve many more steps. Several industrial alliances and working groups have proposed the use of a lightweight protocol for streaming media session control to be employed alongside a separate protocol for delivery of the media data itself.

In one such formulation the real time streaming protocol (RTSP) and the real time transport protocol (RTP) are used in conjunction, for media session control, and media data delivery, respectively. A typical session is illustrated in FIG. 4.

Referring to FIG. 4, the initial step in such processes, which entails a querying of server capability, is optional. However, steps 2 and 3 are generally performed between a streaming client and server before a play request is issued and content streaming commences.

At step 2 of FIG. 4, a description of the requested content is returned to the requesting client. The description serves as a menu of the available streams, e.g., a specification of the audio and video streams that are available in different formats. In addition to format information about each stream, network information about how to access the individual streams is also provided. And, at step 3, the client chooses from the menu of available streams a desired set of streams before issuing a play request to effect a transfer of the selected streams at step 4.

Each of the aforementioned techniques addresses only the initial redirection of requests to locations that are known a priori. Moreover, neither of the systems described have the capacity to dynamically reconfigure itself to address the service needs of different media streams in a streaming media content.

BRIEF DESCRIPTION OF THE DRAWINGS

The accompanying drawings, which are incorporated in and form a part of this specification, illustrate embodiments of the invention and, together with the description, serve to explain the principles of the invention.

SUMMARY OF THE INVENTION

A method for dynamically configuring a network component is disclosed. In one embodiment, the method includes receiving a request for content from a first network connected component and determining a type of media service needed for at least a portion of the content. Moreover, the method includes configuring a network data relaying component to forward at least a portion of the content from a second network connected component to a third network connected component.

DETAILED DESCRIPTION OF THE INVENTION

Reference will now be made in detail to embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well known methods, procedures, components, and circuits have not been described in detail as not to unnecessarily obscure aspects of the present invention.

Figure 1:
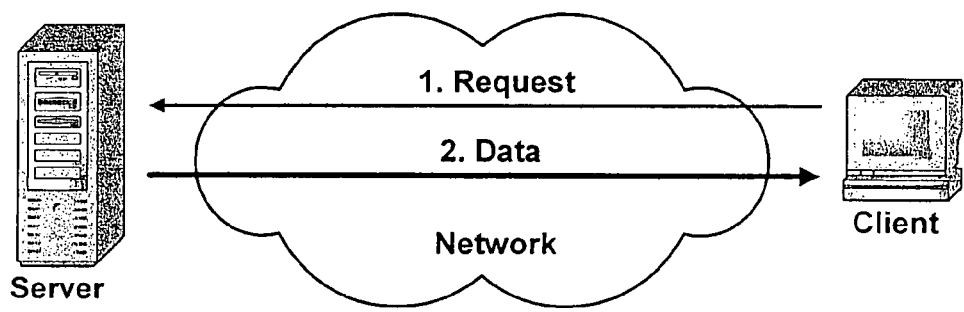
FIG. 1 shows a typical client-server model and illustrates conventional client-server communications.
Figure 2:
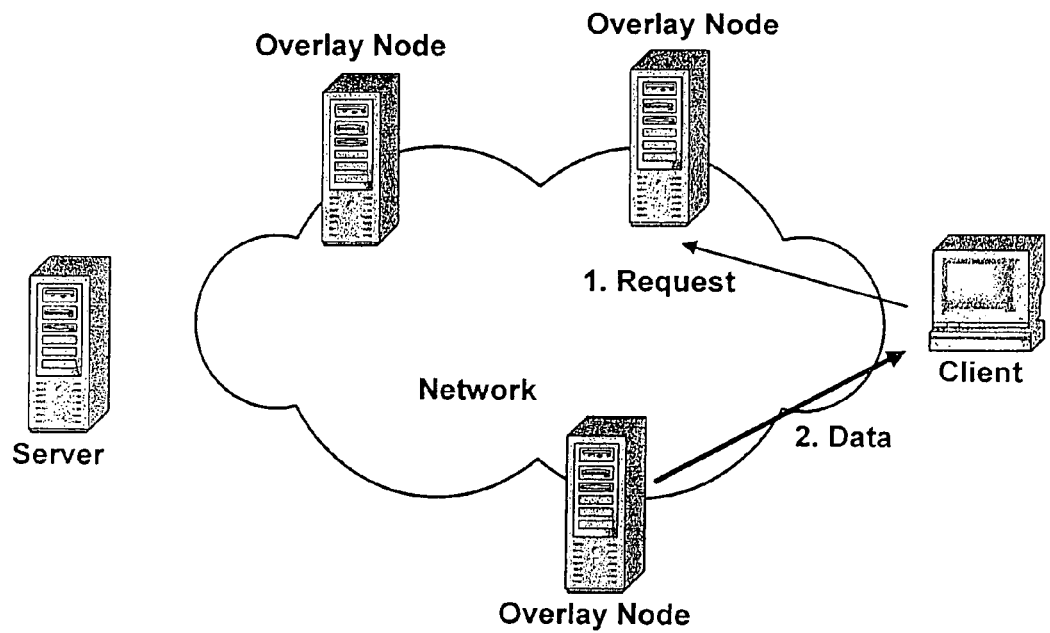
FIG. 2 shows a network that incorporates multiple distributed servers in the form of an overlay network.
Figure 3:
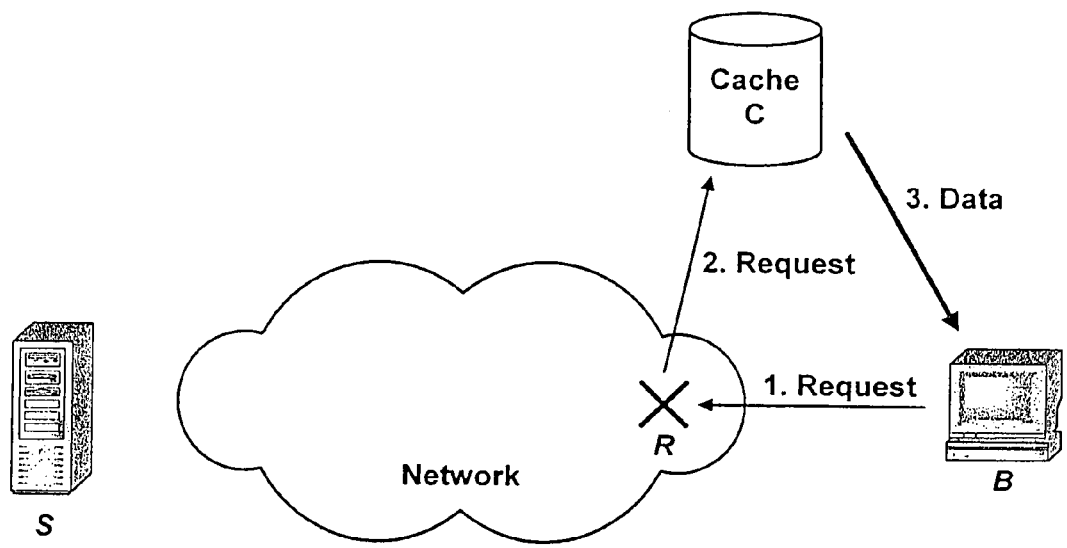
FIG. 3 illustrates the operation of a conventional Web Cache Communication Protocol (WCCP) enabled router.
Figure 4:
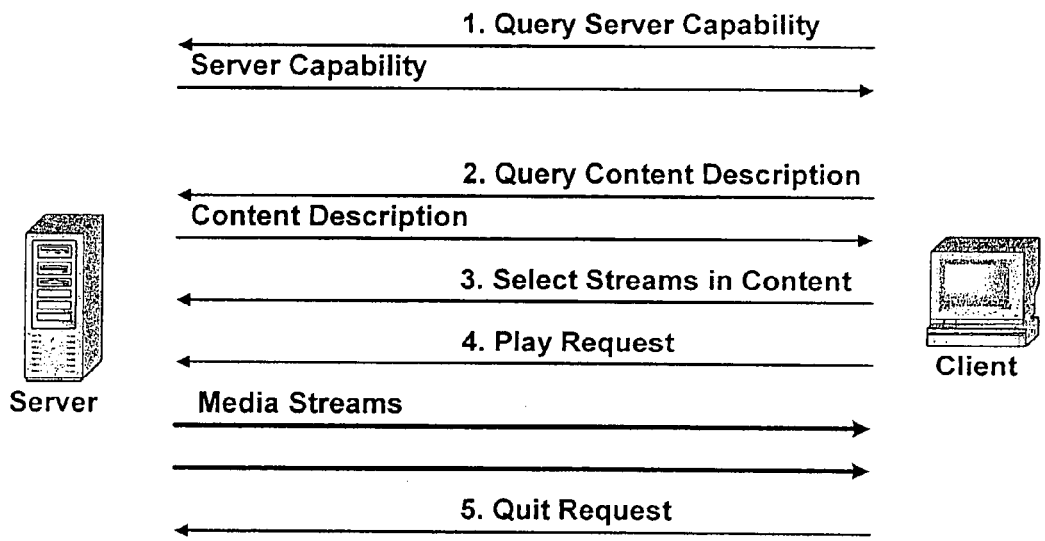
FIG. 4 illustrates a conventional session using real time streaming protocol (RTSP) and real time transport (RTP) protocol.
Figure 5:
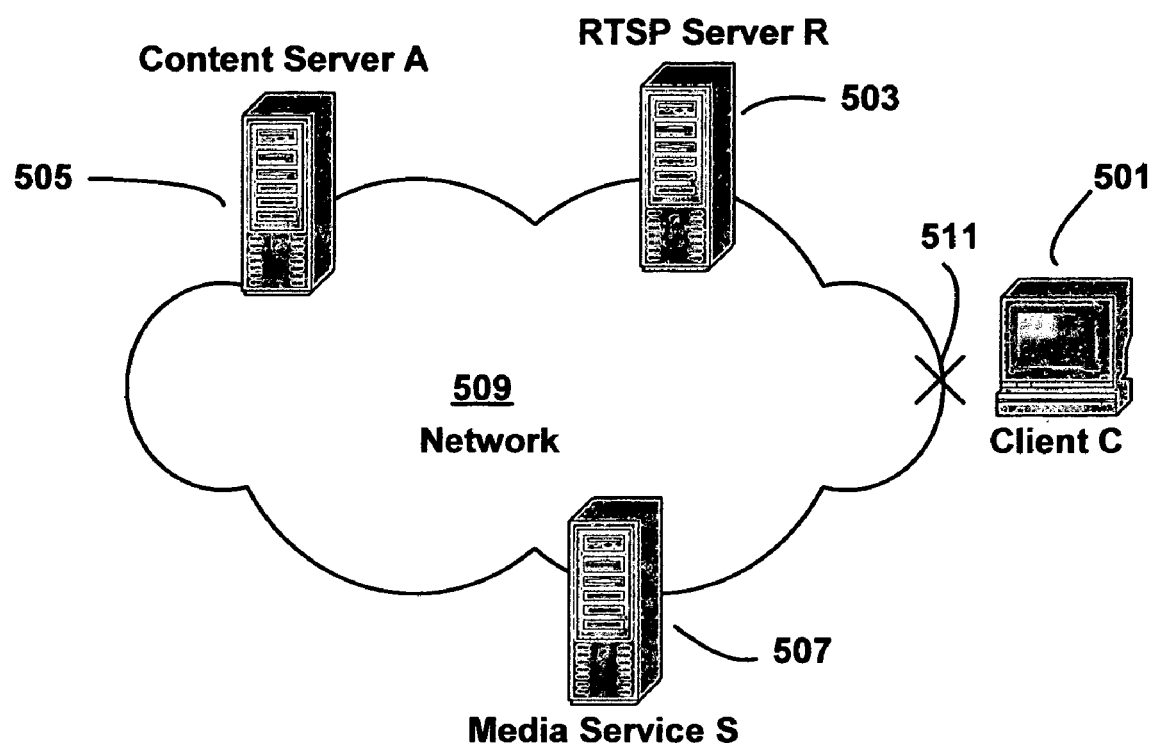
FIG. 5 shows a media services delivery network according to one embodiment of the present invention.

Dynamically Configuring a Network Component in Accordance with Embodiments of the Present Invention FIG. 5 shows a media services delivery network 500 according to one embodiment of the present invention. According to one embodiment, media services delivery network 500 includes both client-server components and an overlay infrastructure that support the delivery of media services to network connected clients. It should be appreciated that media services delivery network 500 accommodates the dynamic configuration of network switches to effect the selective rerouting of streams for servicing at the appropriate network location. FIG. 5 shows client 501, real time streaming protocol (RTSP) server 503, content server 505, media service 507, network 509 and network data relaying component (e.g., switch, router, computer, etc.) 511.

Client device 501 is connected to network 509 and can solicit services from other network connected devices through communications transmitted over network channels. According to one embodiment of the present invention, when client device 501 solicits desired streaming content from a network connected content server (e.g., 505), such as through the transmission of a request, the request can be redirected to an RTSP server (e.g., 503) which can be provided as a component of an overlay infrastructure. According to such embodiments, the client can obtain from the RTSP server (e.g., 503) a list of available streams (e.g., audio, video) which are designated to be delivered to the client device 501 using different identifiers such as User Datagram Protocol (UDP) ports.

It should be appreciated that the redirecting processes described herein can be applied to requests that are transmitted from any network connected client device. It should also be appreciated that any network connected client device is unaware of the existence of such redirecting processes. Consequently, the dynamic streaming media content redirecting system and processes described herein are client transparent.

RTSP server 503 is provided as a component of a network overlay infrastructure that is superimposed on a typical client-server platform. According to one embodiment, the RTSP server 503 is supplied with information that enables it to cause a redirection of packets that are initially slated to be transmitted directly from a first point on the network to a second point on the network (e.g., a content server to a client device) to a third point on the network (e.g., media service provider). It should be appreciated that upon receiving a session initiation request from a client device (e.g., 501), the RTSP server 503 can configure a network switch to redirect designated packets to appropriate service locations.

Media service 507 is a network connected component that can perform designated services on streaming media content. The services that can be provided can include but are not limited to format conversion services such as display size, bit rate, compression standard for video, sampling rate, quality, and compression standard for audio.

Network data relaying component (e.g., switch, router, computer, etc.) 511 is a network connected component that can be programmed to redirect packets. According to one embodiment, a configuration of the switch can be performed by an RTSP server (e.g., 503). It should be appreciated that many types of switches and routers can be used to implement the network data relaying component 511 according to exemplary embodiments. Such switches may include but are not limited to HP PROCURVE 530X series switches. Moreover, network data relaying component 511 can be implemented using any other type of gateway component that can provide the herein described switch functionality.

Content server 505 is a network connected device that can store data and applications that can be accessed by other network connected devices. It should be appreciated that content server 505 can function as a target of requests for services from other network connected device. According to exemplary embodiments, services solicited from client devices that are not provided by content server 505 can be supplied to such client devices by other network connected devices that may provide such services. An identification of network connected devices that provide the solicited service and a redirecting of a stream to the identified device can be accomplished through a selective rerouting of media streams using a dynamic configuration of specified network switches such as described herein.

Network 509 connects network devices and facilitates communication between the network connected devices. Network 509 encompasses a typical client-server arrangement that includes an overlay infrastructure for effecting the selective rerouting of media streams.

Figure 6:
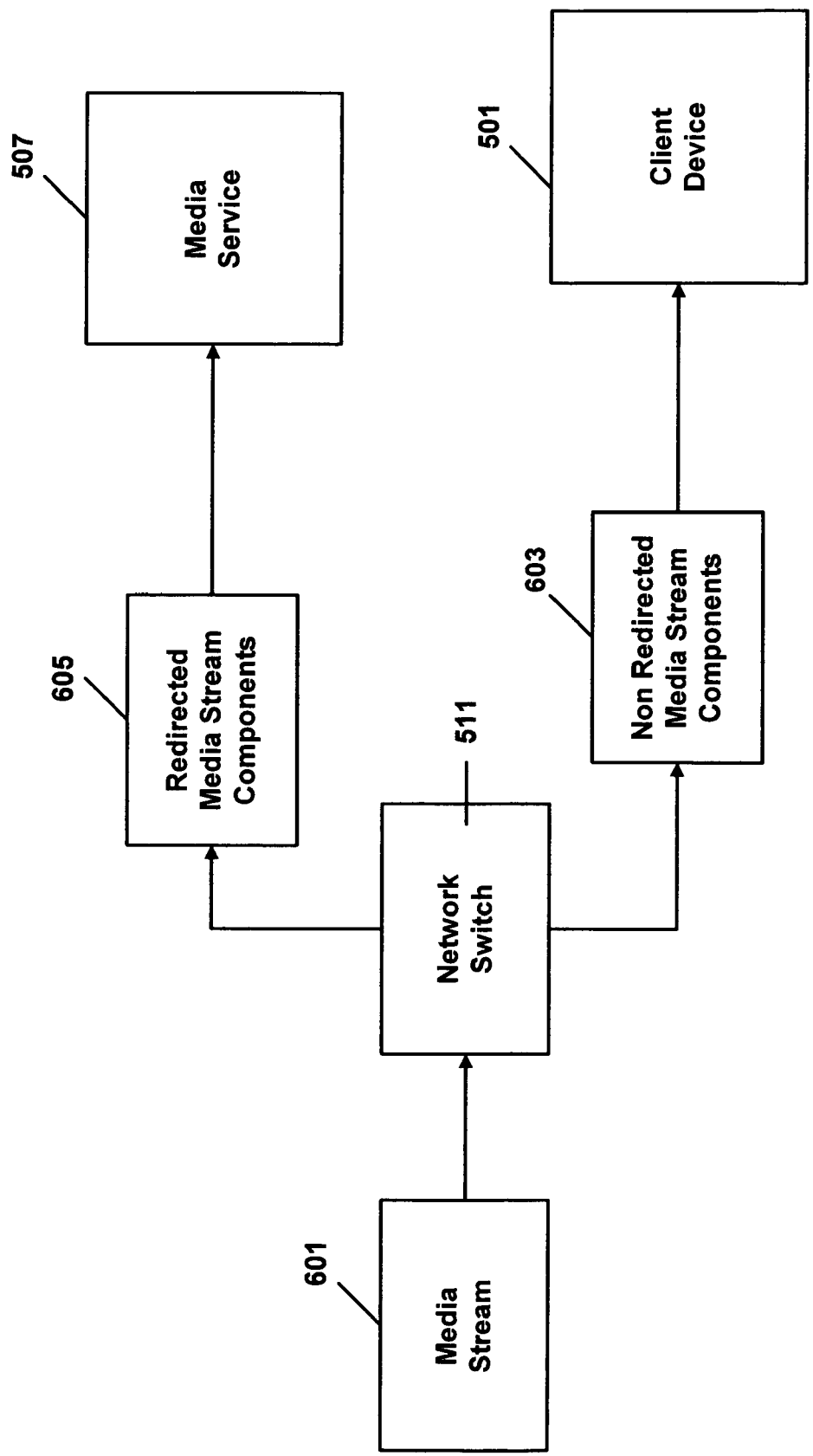
FIG. 6 shows a functional block diagram that illustrates the interrelationship between network connected devices and streaming media components according to one embodiment of the invention.

FIG. 6 shows a functional block diagram that illustrates the interrelationship between network connected devices and streaming media components according to one embodiment of the invention. FIG. 6 shows network data relaying component (e.g., switch, router etc.) 511, client device 501, media service 507, incoming media stream 601, non-redirected media stream 603, redirected media stream 605, and serviced media stream 607.

As discussed with reference to FIG. 5, network data relaying component 511 can be dynamically configured to reroute media streams or components thereof. For example, in a case where an incoming media stream 601 contains stream components whose proper handling necessitates a redirection of those stream components 603 to a media service, the network data relaying component 511 can redirect the stream components that need to be serviced to the appropriate media service 507 and forward other packets directly to the appropriate client device 501.

It should be appreciated that the network data relaying component 511 is configured to separate the packets of incoming media stream 501 into non-redirected media stream 603 and redirected media stream 605 components. The separated components are forwarded appropriately. It should be appreciated that this process results in a selective rerouting by the network switch of specified components (e.g., 605) of the incoming media stream based on configurations of the network data relaying component 511 that are provided dynamically (as requests are received) by a RTSP server (e.g., see FIG. 5, structure 503).

Figure 7:
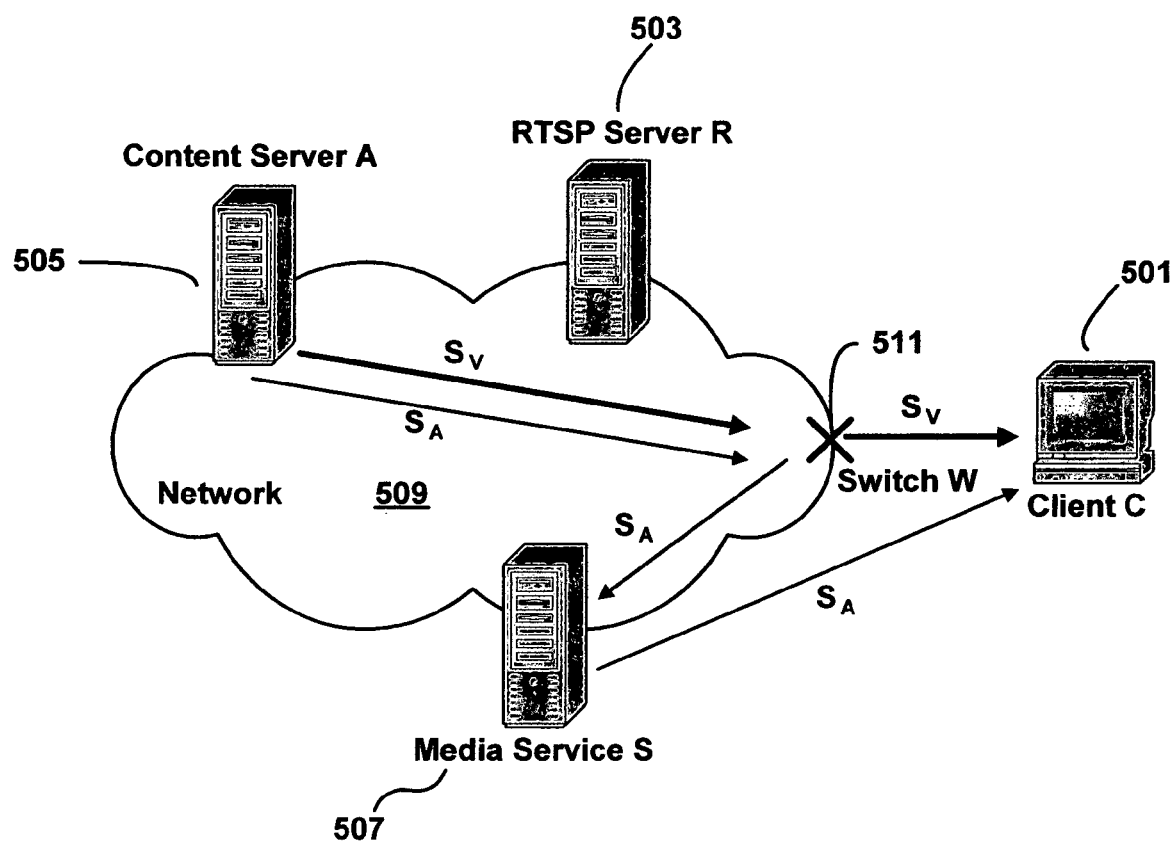
FIG. 7 illustrates the operations executed in a process causing the dynamic configuration of network switch according to one embodiment of the present invention.

FIG. 7 illustrates the operations executed in a process causing the dynamic configuration of network data relaying component (e.g., switch, router, etc.) 511 according to one embodiment of the present invention. FIG. 7 illustrates how a network switch can be configured to redirect content when a request is made from a client device 501 to a content server 505 for content that the content server 505 can only provide in an a format (e.g., audio) that the client device 501 is not equipped to accommodate.

In such cases, if media service 507 is capable of converting the solicited content into the desired format, then delivery can be facilitated by the RTSP server 503. According to one embodiment, this can be accomplished by having the client device 501 communicate the content request to the RTSP server 503 which can facilitate an audio format conversion of the audio portion of the content by selectively rerouting that portion of the content to media service device 507 which can perform the desired format conversion.

It should be appreciated that for a streaming session that contains both an audio and a video stream, a typical network infrastructure will merely deliver both streams using the same path. As a result, in cases such as described above, both the audio and video streams will need to be routed through media service device 507. Such a methodology is resource wasteful, since media services are actually needed only for the low-bandwidth audio stream. In addition, the high bandwidth video stream has to be routed an additional distance unnecessarily.

Referring to FIG. 7, if a request is made from client device 501 for streaming content from content server 505 using the redirection techniques described herein, the request can be redirected to an RTSP server 503 which is part of an overlay infrastructure (see description of RTSP server 503 above). Through the RTSP server 503, the client 501 can obtain a list of available streams, including audio stream $S_A$ and video stream $S_V$, which are to be delivered to client 501 at audio port $N_A$ and video port $N_V$, (not shown) respectively. In this example it is assumed that media service 507 needs to be performed on the audio stream $S_A$. Upon receiving the session initiation request from client 501, RTSP server 503 has enough information to configure network data relaying component 511 so that all packets from content server 505 to client 501 will be directed to media service 507.

There are two consequences that result from the operations described with reference to FIG. 7. First, the high bit-rate video stream $S_V$ destined to client 501 at port $N_V$ will be delivered directly to 501. Second, only the low bit rate audio stream $S_A$ that needs to be delivered to 507 will be rerouted (see FIG. 8 discussion below).

Figure 8:
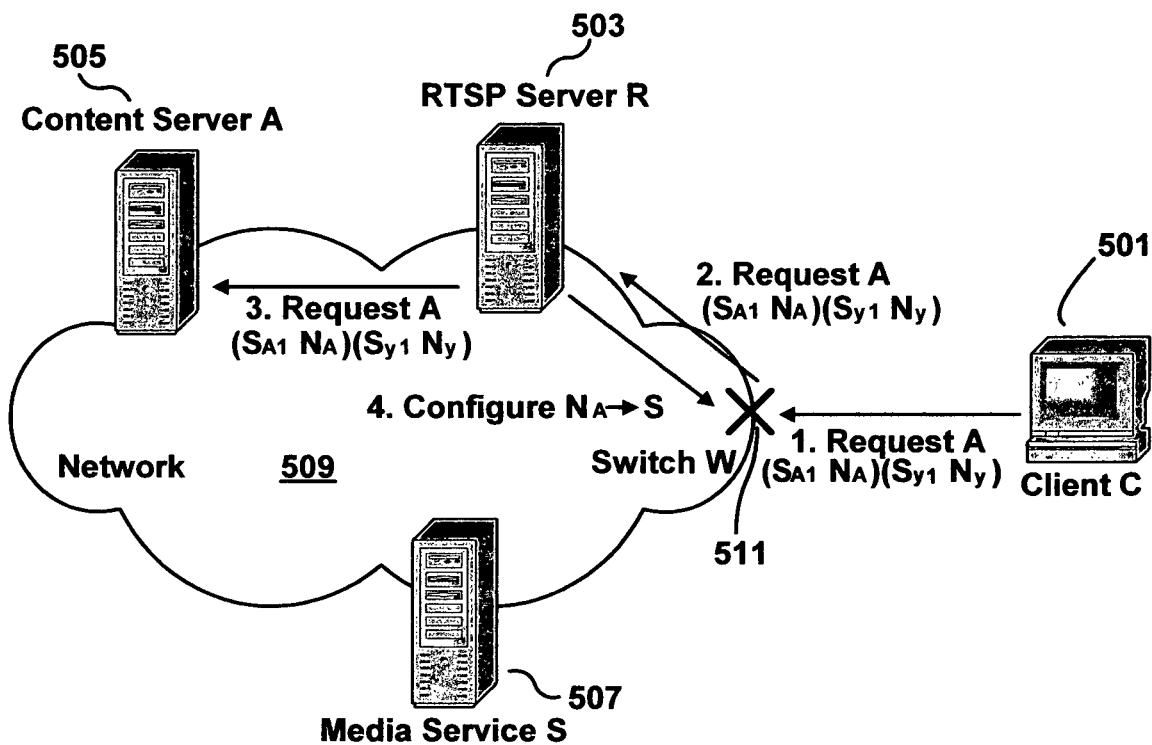
FIG. 8 illustrates an example of the selective rerouting of streams that results from dynamic switch configuration processes according to one embodiment of the present invention.

FIG. 8 illustrates an example of the selective rerouting of streams that results from dynamic switch configuration processes according to one embodiment of the present invention. FIG. 8 shows the paths traveled by requested streaming media content components as they move from content server 505 to client device 501.

Referring to FIG. 8, after the network data relaying component 511 has been configured to redirect streaming components to media service device 507 (as described with reference to FIG. 7), the incoming stream consisting of components $S_V$ (streaming video) and $S_A$ (streaming audio) is parsed with the component portions being separated into separate streams. This separation facilitates the forwarding of the video component $S_V$ of the stream to media service 507 for servicing. Once serviced this media stream component (e.g., $S_V$) is forwarded to the end user (e.g., client device 501) for use.

It should be appreciated that the performance penalty for the embodiments described with reference to FIGS. 7 and 8 is minimal. According to one embodiment, in order to execute the routing of requests to RTSP server 507, the network data relaying component 511 only needs to be configured to reroute RTSP packets. Such rerouting constitutes a very low volume task as compared to the rerouting of the media data that is carried by real time transport (RTP). Moreover, rerouting is only performed when it is necessary. It should be noted that RTSP server 507 has the capacity to dynamically configure network data relaying component 511 when user requests arrive, and to undo the configuration when media streaming ends. This type of on demand configuration, based on session control information, is not possible with general Web accesses, since in those cases there is a lack of available session information.

Exemplary Operations in Accordance with Embodiments of the Present Invention

Figure 9:
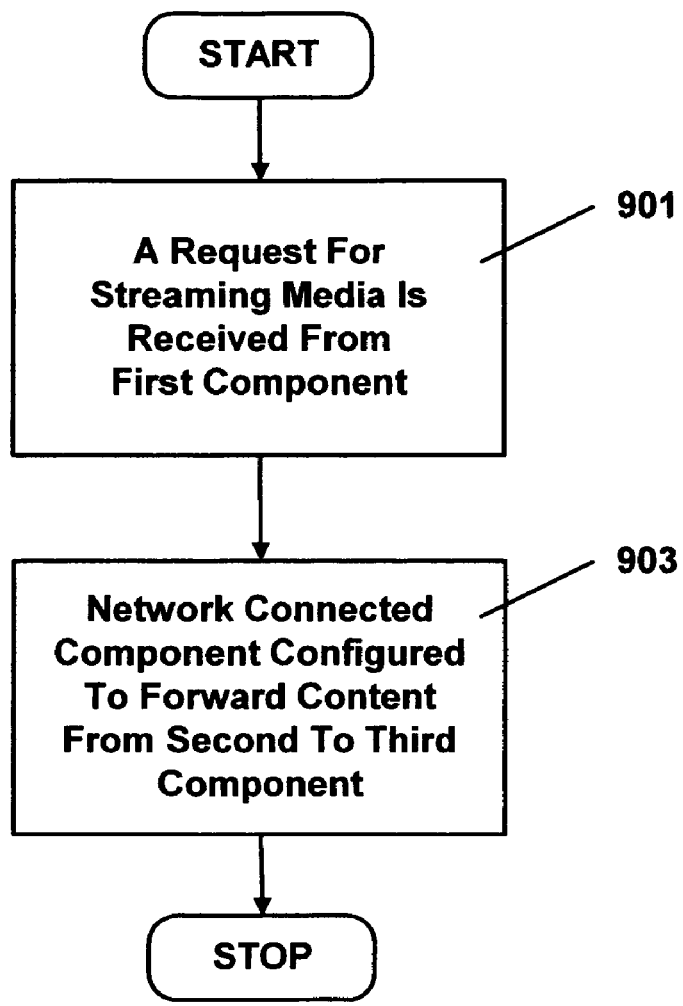
FIG. 9 is a flowchart of the steps performed in a process for dynamically configuring a switch according to one embodiment.
Figure 10:
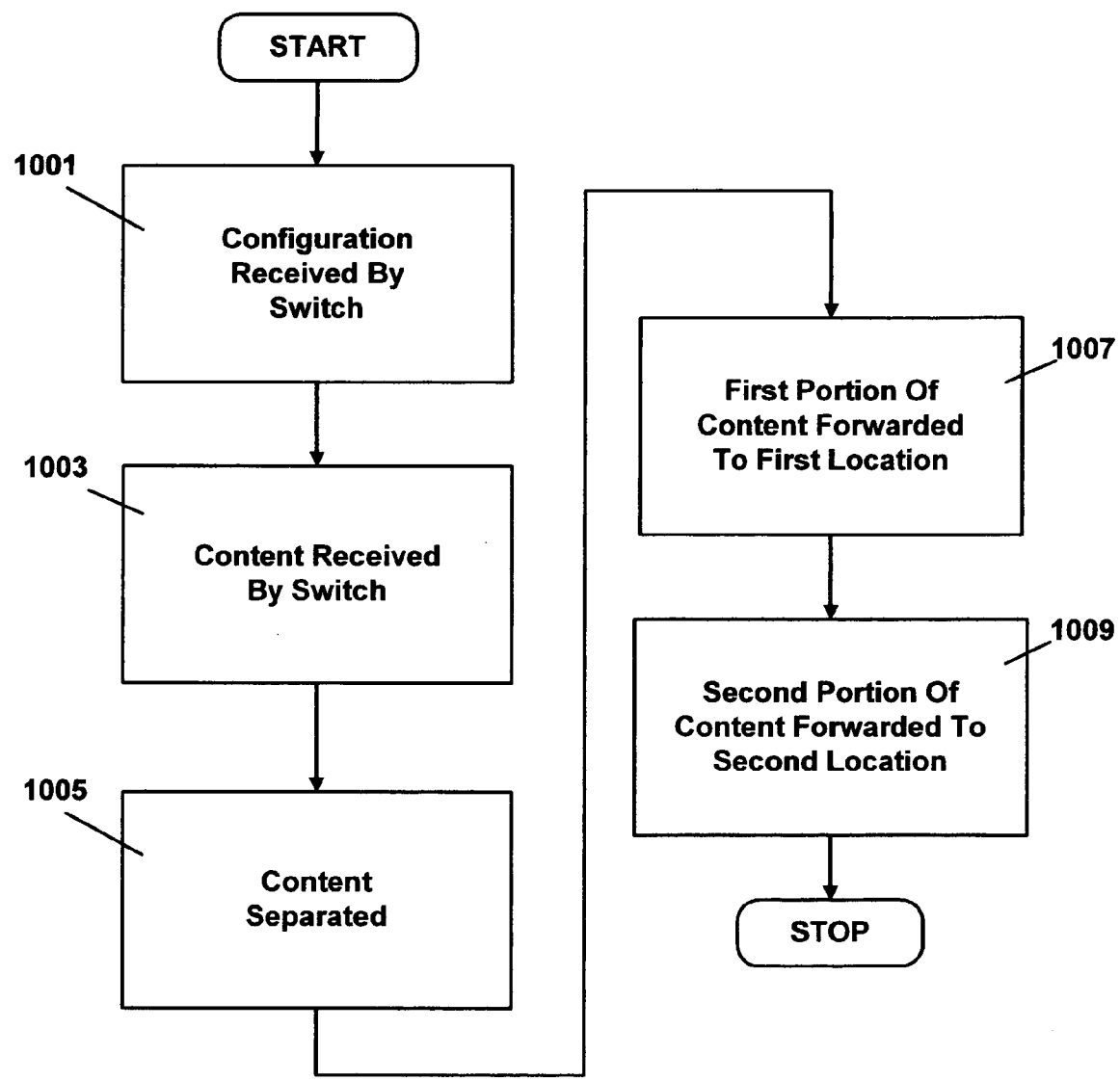
FIG. 10 is a flowchart of the steps performed in a process for selective switching of streaming media components according to one embodiment of the invention.

FIGS. 9 and 10 show flowcharts of the steps performed in accordance with embodiments of the present invention. The flowcharts include processes of the present invention which, in one embodiment, are carried out by processors and electrical components under the control of computer readable and computer executable instructions. The computer readable and computer executable instructions reside, for example, in data storage features such as computer usable volatile memory and/or computer usable non-volatile memory. However, the computer readable and computer executable instructions may reside in any type of computer readable medium. Although specific steps are disclosed in the flowcharts such steps are exemplary. That is, the present invention is well suited to performing various other steps or variations of the steps recited in FIGS. 9 and 10. Within the present embodiment, it should be appreciated that the steps of the flowcharts may be performed by software, by hardware or by any combination of software and hardware.

FIG. 9 is a flowchart 900 of the steps performed in a process for dynamically configuring a switch according to one embodiment. It should be appreciated, that in such processes, a media services delivery network (e.g., 500) accommodates the dynamic configuration of network switches to effect the selective rerouting of streams for servicing at the appropriate network location.

At step 901, a request for streaming media content is received by a network connected server (e.g., 503) from a first network connected component (e.g., client device 501). And, at step 903, a network connected component (e.g., network data relaying component 511) is configured (by the network connected server) to forward portions of the requested content from a second network connected component (e.g., server 505) that stores the requested content, to a third network connected component (e.g., media service 507) to be serviced.

FIG. 10 is a flowchart 1000 of the steps performed in a process for selective switching of streaming media components according to one embodiment of the invention. The capacity to selectively switch media stream components allows the separating and the forwarding of a selected component of the media stream to a media service (e.g., 507) for servicing. Once serviced this media stream component can be forwarded to the end user (e.g., client device 501) and integrated with other media stream components for use.

At step 1001, a configuration is received by the network data relaying component. According to one embodiment, the configuration is performed by a network connected server. Moreover, at step 1003, streaming media content is received by the network data relaying component. According to one embodiment, the media content is supplied to the switch by an RSTP server, where, at step 1005, the streaming media content is separated.

At step 1007, a first portion of said streaming media content is forwarded to a first network location (e.g., client device 501). And, at step 1009, a second portion of said streaming media is forwarded to a second network location (e.g., media service 507). Once serviced, as mentioned above, this media stream component can be forwarded to the end user (e.g., client device 501) and integrated with other media stream components for use.

As noted above with reference to exemplary embodiments thereof, the present invention provides a method for client transparent insertion of streaming media services. The method involves receiving a request for content from a first network connected component and determining a type of media service needed for a portion or the whole of said content. Moreover, the method includes configuring a network switch to forward the portion or the whole of said content from a second network connected component to a third network connected component.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for dynamically configuring a network component to reroute media streams, comprising:
   receiving a request for content from a first network connected component;
   determining a type of media service needed to be performed by a third network connected component on at least a portion of said content to fulfill said request, wherein said type of media service comprises format conversion services;
   configuring a data relaying component to forward said at least a portion of said content from a second network connected component to said third network connected component, said at least a portion of said content to receive said type of media service performed by said third network connected component,
   configuring said data relaying component to forward packets of said content that do not need said type of media service to be performed thereon directly to said first network connected component; and
   after said data relaying component forwards said at least a portion of said content from said second network connected component to said third network connected component, undoing said configuring.

2. The method of claim 1 wherein said step of receiving said request for content is performed by a network connected server.

3. The method of claim 1 wherein said request is for streaming media content.

4. The method of claim 1 wherein said first network connected component is a client device.

5. The method of claim 1 wherein said second network connected component is a content server.

6. The method of claim 1 wherein said third network connected component is a media service component that receives said content, performs a media service and transmits the content to a client device.

7. The method of claim 1 wherein said configuring is performed by a real time streaming protocol (RTSP) server.

8. The method of claim 1 wherein said content is redirected to said third network connected component while en route to said first network connected component.

9. The method of claim 1 wherein said request is redirected using Internet domain name service (DNS) based redirection techniques.

10. The method of claim 1 wherein said content or request is redirected using a web cache communication protocol (WCCP) routing mechanism.

11. The method of claim 1 wherein a server receives said request routed by said data relaying component, and supplies routing configuration instructions to said data relaying component to create or destroy a rule to route selected streams to a media service.

12. A computer non-transitory readable storage medium having computer useable code embodied therein causing a computer to perform operations comprising:
   receiving a request for content from a first network connected component;
   determining a type of media service needed to be performed by a third network connected component on at least a portion of said content to fulfill said request, wherein said type of media service comprises format conversion services;

configuring a data relaying component to forward said at least a portion of said content from a second network connected component to said third network connected component, said at least a portion of said content to receive said type of media service performed by said third network connected component, and configuring said data relaying component to forward packets of said content that do not need said type of media service to be performed thereon directly to said first network connected component; and after said data relaying component forwards said at least a portion of said content from said second network connected component to said third network connected component, undoing said configuring.

13. The medium of claim 12 wherein said step of receiving said request for content is performed by a network connected server.

14. The medium of claim 12 wherein said request is for streaming media content.

15. The medium of claim 12 wherein said first network connected component is a client device.

16. The medium of claim 12 wherein said second network connected component is a content server.

17. The medium of claim 12 wherein said third network connected component is a media service component that receives said content, performs a media service and transmits the content to a client device.

18. The medium of claim 12 wherein said configuring is performed by a RTSP server.

19. The medium of claim 12 wherein said content is redirected to said third network connected component while en route to said first network connected component.

20. The medium of claim 12 wherein said request is redirected using DNS based redirection techniques.

21. The medium of claim 12 wherein said request or content is redirected using a WCCP routing mechanism.

22. The medium of claim 12 wherein a server receives said request routed by said data relaying component, and supplies routing configuration instructions to said data relaying component to create or destroy a rule to route selected streams to a media service.

23. A server comprising:

a memory for storing a request for content from a first network connected component; and a processor coupled to said memory, said processor configured for determining a type of media service needed to be performed by a third network connected component on at least a portion of said content to fulfill said request, wherein said type of media service comprises format conversion services, for configuring a network data relaying component to forward said at least a portion of said content from a second network connected component to said third network connected component, said at least a portion of said content is to receive said type of media service performed by said third network connected component, for configuring said data relaying component to forward packets of said content that do not need said type of media service to be performed thereon directly to said first network connected component, and after said data relaying component forwards said at least a portion of said content from said second network connected component to said third network connected component, for undoing said configuring.

24. The server of claim 23 wherein step of receiving said request for content is performed by a network connected server.

25. The server of claim 23 wherein said request is for streaming media content.

26. The server of claim 23 wherein said first network connected component is a client device.

27. The server of claim 23 wherein said second network connected component is a content server.

28. The server of claim 23 wherein said third network connected component is a media service.

29. The server of claim 23 wherein said configuring is performed by a RTSP server.

30. The server of claim 23 wherein said content is redirected from said first network connected component to said third network connected component.

31. The server of claim 23 wherein said request is redirected using DNS based redirection techniques.

32. The server of claim 23 wherein said content or request is redirected using a WCCP routing mechanism.

33. The server of claim 23 wherein said server receives said request routed by said data relaying component, and supplies routing configuration instructions to said data relaying component to create or destroy a rule to route selected streams to a media service.

* * * * *

UNITED STATES PATENT AND TRADEMARK OFFICE
CERTIFICATE OF CORRECTION

PATENT NO.       : 7,945,648 B2
APPLICATION NO.  : 10/695259
DATED            : May 17, 2011
INVENTOR(S)      : Wai-tian Tanet It is certified that error appears in the above-identified patent and that said Letters Patent is hereby corrected as shown below:

In Sheet 5 of 10, line 1, insert --500-- above "RTSP Server R".

Signed and Sealed this
Twentieth Day of December, 2011

David J. Kappos
*Director of the United States Patent and Trademark Office*